No. 754,987. PATENTED MAR. 22, 1904.
H. C. FOX.
SAD IRON.
APPLICATION FILED AUG. 6, 1903.
NO MODEL.

Witnesses
Harry L. Amer
Herbert D. Lawson

Inventor
Henry C. Fox
By Victor J. Evans
Attorney

No. 754,987.

Patented March 22, 1904.

UNITED STATES PATENT OFFICE.

HENRY CLAY FOX, OF LOUISVILLE, KENTUCKY.

SAD-IRON.

SPECIFICATION forming part of Letters Patent No. 754,987, dated March 22, 1904.

Application filed August 6, 1903. Serial No. 168,490. (No model.)

*To all whom it may concern:*

Be it known that I, HENRY CLAY FOX, a citizen of the United States, residing at Louisville, in the county of Jefferson and State of Kentucky, have invented new and useful Improvements in Sad-Irons, of which the following is a specification.

My invention relates to new and useful improvements in sad-irons, and is more especially an improvement upon the devices described and claimed by me in Patents Nos. 265,401, of October 3, 1882, 350,239, of October 5, 1886, and 359,016, of March 8, 1887.

The object of the invention is to provide a handle of novel construction, together with locking means whereby said handle may be automatically locked to both ends of the sad-iron after it has been adjusted to desired position.

A further object is to so construct the handle as to prevent splitting of the grip thereof by removing all strain thereon.

With the above and other objects in view the invention consists in the novel construction, combination, and arrangement of parts hereinafter more fully described and claimed, and illustrated in the accompanying drawings, in which—

Figure 1:
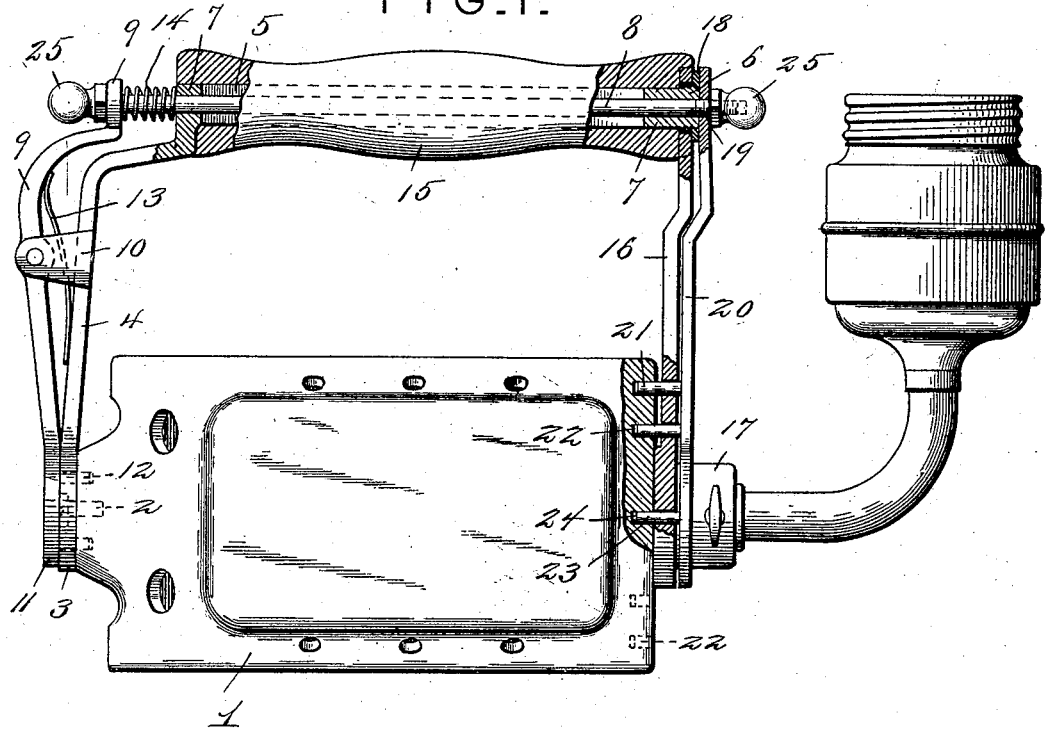
Figures 2, 3:
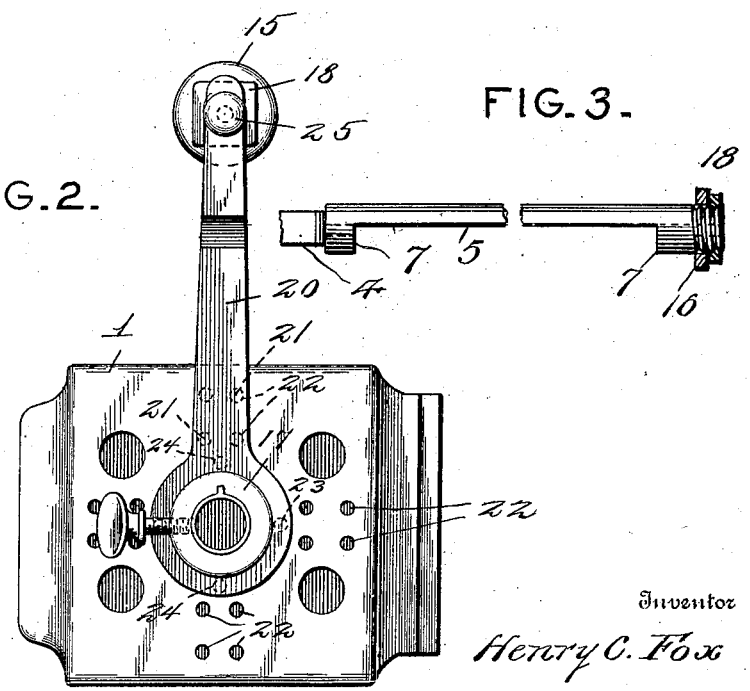

Figure 1 is a side elevation of a sad-iron constructed in accordance with my invention, a portion of the handle and the locking means being shown in section. Fig. 2 is a rear elevation of the handle and iron, and Fig. 3 is a detail view of the sleeves and the extension interposed therebetween.

Referring to the drawings by numerals of reference, 1 is a sad-iron of any suitable construction and preferably of the form described and claimed in my patents hereinbefore mentioned. Pivotally mounted upon a screw 2 at the forward end of the iron is a disk 3, which is formed integral with an arm 4, having an extension 5 formed at an angle thereto and provided with a screw-threaded end 6. This extension 5 is semicylindrical in form, and at the ends thereof are formed integral sleeves 7, in which is slidably mounted a rod 8, which extends longitudinally of the extension 5. One end of this rod is loosely mounted within the upper end of a lever 9, which is fulcrumed at a point between its ends between ears 10, formed upon the arm 4. A disk 11 is arranged at the lower end of lever 9 and has pins 12 extending therefrom and through apertures in the disk 3, and these pins are adapted to project into recesses in the end of the iron 1 and lock the arm 4 thereto. A spring-strip 13 is interposed between the arm 4 and lever 9, and a coiled spring 14 is mounted on the rod 8 at a point between the extension 5 and lever 9. A grip 15, formed of wood or other suitable material, is arranged upon the extension 5 and is recessed at its ends to receive the upper end of the arm 4 and the end of a second arm 16, which incloses the extension 5 and is loosely mounted upon a boss 17, projecting from the rear end of the iron. This arm is held within its recess in the grip 5 by means of a nut 18, which engages the screw-threaded portion 6 of the extension 5.

The rod 8 is screw-threaded at its rear end, as shown at 19, and is rigidly connected to an arm 20, which is also loosely mounted on the boss 17, and extending from this arm at a point between the boss and the grip 15 is a series of preferably four pins 21, which project through apertures provided therefor in the arm 16 and are adapted to engage one of several series of apertures or recesses 22, formed in the rear end of the iron 1. Pins 23 also project from the arm 20 through apertures provided therefor in the arm 16 and are adapted to project into apertures 24 in the end of the iron and adjacent boss 17. Knobs 25 are secured to the two ends of rods 8, so as to bind together the several parts mounted thereon.

When it is desired to swing the handle in relation to the iron, it is merely necessary to advance one of the fingers of the hand holding the grip 15 and press the forward knob 25 inward, so as to compress springs 13 and 14. This will cause the lower end of lever 9 to swing outward, so as to remove pins 12 from the recesses in iron 1. Simultaneous with this movement rod 8 will be moved longitudinally within the extension 5, and its sleeves 7 and arm 20 will be caused to be moved longitudinally upon boss 17, so as to retract the pins 21 and 23 from their respective recesses. The handle can then be swung into desired position, and as soon as the knob 25 is released and the pins are in position over the proper series of recesses said pins will be automatically moved into these recesses by the springs 13 and 14. It will be understood that by locking the handle to both ends of the iron injury to the handle by twisting is prevented and a rigid connection between the iron and handle is attained. Moreover, by forming the arm 4 and the extension 5 in a single casting much of the strain upon the grip 15 is removed, and the same is therefore rendered more durable than where it is mounted upon a rod which is separate from arm 4, as in such case the grip is liable to be split by rotating with the rod therein. If desired, in lieu of constructing the rod 8 and the arm 20 in two pieces the same may be made integral.

In the foregoing description I have shown the preferred form of my invention; but I do not limit myself thereto, as I am aware that modifications may be made therein without departing from the spirit or sacrificing the advantages thereof, and I therefore reserve the right to make such changes and alterations as may fairly fall within the scope of my invention.

Having thus described the invention, what I claim as new, and desire to secure by Letters Patent, is—

1. The combination with a sad-iron; of a handle pivotally connected to the ends thereof, a lever fulcrumed upon one end of the handle, pins thereon adapted to engage one end of the iron, a rod slidably mounted within the handle and engaging the lever, an arm on the rod, pins extending therefrom adapted to engage the other end of the iron, and means for holding the pins normally in engagement with the iron.

2. The combination with a sad-iron; of a handle pivotally mounted upon the ends thereof, a lever fulcrumed upon one end of the handle, pins extending therefrom and adapted to engage one end of the iron, a rod slidably mounted within the handle and engaging the lever, an arm on the rod, pins extending therefrom and adapted to engage the other end of the iron, and a spring for holding the pins normally in engagement with the ends of the iron.

3. The combination with an iron; of an arm pivotally connected to one end thereof, an extension to said arm having integral sleeves at the ends thereof, a grip mounted upon the extension and sleeves, a rod slidably mounted within the extension, a lever pivoted to the arm and engaged by the rod, a pin extending from the lever and adapted to lock the arm to one end of the iron, an arm pivotally connected to the other end of the iron and connected to the extension, an arm on the rod, pins extending from the last-mentioned arm and adapted to engage the other end of the iron, and a spring upon the rod and between the lever and extension.

4. The combination with a sad-iron; of a handle pivotally connected to the ends thereof, pins slidably mounted within the ends of the handle and normally seated in recesses in the ends of the iron, means mounted within the handle for simultaneously retracting the pins from engagement with the ends of the iron, and mechanism for holding the pins normally seated in the recesses.

In testimony whereof I affix my signature in presence of two witnesses.

HENRY CLAY FOX.

Witnesses:
 DANIEL SCHRIEBER,
 J. T. WATERMAN.